United States Patent Office 3,455,754
Patented July 15, 1969

3,455,754
PROCESS FOR LAMINATING HALOGEN OR HYDROGEN HALIDE TREATED POLYVINYL ACETAL TO GLASS
Harold O. Buzzell, Wollaston, and Robert S. Rizzotto, Hingham, Mass., assignors to Polaroid Corporation, Cambridge, Mass., a corporation of Delaware
No Drawing. Filed Dec. 30, 1965, Ser. No. 517,795
Int. Cl. B32b *31/12, 17/10*
U.S. Cl. 156—99                                  8 Claims

ABSTRACT OF THE DISCLOSURE

This invention is concerned with laminating processes and, more particularly, with improved processes for laminating glass to polyvinyl acetals.

---

Polyvinyl acetals, e.g., polyvinyl butyral, have been extensively used as adhesive layers in safety glass and in laminating other optical devices such as plastic polarizers to glass supports. In such uses, a layer of the polyvinyl acetal is inserted between the glass and the sheet which is to be adhered and the resulting sandwich is subjected to heat and pressure.

One object of the present invention is to provide processes for improving the adhesion between glass and polyvinyl acetals.

Another object of the present invention is to provide improved glass supported plastic light polarizers.

Still another object of the present invention is to provide improved safety glass.

Other objects of the invention will in part be obvious and will in part appear hereinafter.

The invention accordingly comprises the process involving the several steps and the realtion and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

It has been found that the adhesiveness of polyvinyl acetals and especially their adhesiveness to glass may be substantially enhanced by surface treating said acetals, prior to adhesion, with a halogen or hydrogen halide.

The surface treatments of the present invention are preferably carried out by merely exposing the acetals to halogen or hydrogen halide vapors. This may be conveniently accomplished by passing a film or coating of the acetal through a chamber containing the desired halogen or hydrogen halide vapor. Generally the halogens occur in gaseous form or can be readily sublimed into the chamber with gentle heating. Usually an adequate amount of the hydrogen halide may be supplied by vaporizing an aqueous solution containing the desired halide. Particularly useful results have been obtained using vapors of iodine, bromine, chlorine hydrogen chloride, hydrogen bromide, and hydrogen iodide.

Generally, the polyvinyl acetals which are treated by the processes of the present invention are condensation products of aldehydes and polyvinyl alcohols. The acetals upon which the invention has been found particularly useful are those formed from aliphatic aldehydes, and especially aliphatic aldehydes comprising 1 to 4 carbon atoms, e.g., formaldehyde, acetaldehyde, propionaldehyde, and butyraldehyde. Particularly good results have been obtained on polyvinyl butyral.

As is known, polyvinyl alcohols are hydrolysis products of polyvinyl acetate. The term "polyvinyl alcohol" as used herein, is intended to include the partially hydrolyzed polymers as well as the fully hydrolyzed materials. Such polyvinyl alcohols are readily available commercially. Generally at least about 40% of the acetate groups are hydrolyzed and more particularly at least about 70%. In the more fully hydrolyzed materials about 95 to 100% of the acetate groups are hydrolyzed.

The degree of acetalization in the acetals, treated by the processes of the present invention, generally may be varied to suit particular needs. Usually the polymers will comprise between about 43 to 90% of acetalized hydroxy groups. The most widely used acetal polymers generally comprise between about 60 to 90% of acetalized hydroxy groups.

When desired, the acetal films treated by the processes of the present invention may also have other ingredients incorporated therein, such as plasticizers, dyes, stabilizers, fillers, etc.

The following nonlimiting examples illustrate the processes of the present invention:

Example 1

A coating solution comprising 70 gms. of Alvar 7/70 (a polyvinyl alcohol-acetaldehyde acetal produced by Shawinigan Products Co. and stated to contain 5% hydroxyl and 25% acetate), 21 gms. of dibutyl sebacate, 225 cc. of ethylene-glycol methyl ether, 225 cc. of butanol, 100 cc. of ethanol and 450 cc. of xylene was applied to the cellulose acetate butyrate support of a light polarizer comprising said support and an iodine-stained, molecularly oriented polyvinyl alcohol layer. The resulting coating was fumed with iodine in a beaker for 10 seconds. The treated layer of the acetal was laminated to a piece of six-curve glass under a pressure of 220 lbs./sq. in., at 280° F., for 2 minutes. The resulting laminate exhibited improved adhesion to glass as compared to a similar laminate made without the iodine treatment.

Example 2

A laminate was prepared in a manner similar to Example 1 except that a coating solution comprising 500 cc. of methylene dichloride, 11 gms. of dibutyl sebacate and 35 gms. of Formvar 15/95S (a polyvinyl alcohol-formaldehyde acetal produced by Shawinigan Products Co. and stated to contain 7–9% hydroxyl and 9.5–13% acetate) was used in place of the Alvar 7/70 coating solution. The resulting laminate had improved adhesion to glass as compared to a similar laminate which was not subjected to the iodine treatment.

Example 3

A laminate was prepared in a manner similar to Example 1 except that 70 gms. of Butvar B–72 (a polyvinyl alcohol-butyraldehyde acetal produced by Shawinigan Products Co. and stated to contain 17.5% hydroxyl and 2.5% acetate, and to be 80% butyral expressed as polyvinyl butyral) was used in place of the Alvar 7/70 and the lamination was carried out at 300° F. The resulting laminate exhibited excellent adhesion to glass and was markedly improved over a similar laminate prepared without the iodine treatment.

Example 4

A laminate was prepared in a manner similar to Example 1 except that (1) 40 gms. of Butvar BO72 and 60 gms. of castor oil were used in place of the Alvar 7/70 and dibutyl sebacate in the coating solution, and (2) hydrogen chloride vapors from a heated concentrated hydrochloric acid solution were used in place of the iodine. The resulting laminate exhibited excellent adhesion and was markedly better than a similar laminate which was not subjected to the hydrogen chloride vapors.

Example 5

A sheet of Butacite polyvinyl butyral (trademark of E. I. du Pont de Nemours and Company) was subjected to bromine vapors for 10 seconds in a beaker and laminated between a six-curved glass and a light polarizer as in Example 1. The resulting laminate exhibited improved adhesion over a similar laminate which was prepared without the bromine treatment.

Example 6

A laminate was prepared in a manner similar to Example 5 except that the polyvinyl butyral sheet was treated with the vapors from a heated concentrated solution of hydrogen iodide in place of the bromine vapors. The resulting laminate exhibited improved adhesion.

Example 7

A laminate was prepared in a manner similar to Example 5 except that the polyvinyl butyral sheet was treated with the vapors from a heated concentrated aqueous solution of hydrogen bromide in place of the bromine vapors. The resulting laminate exhibited markedly improved adhesion.

Example 8

A laminate was prepared in a manner similar to Example 5 except that hydrogen chloride vapors from a heated concentrated aqueous solution of hydrogen chloride were used in place of the bromine. The resulting laminate exhibited markedly improved adhesion.

Example 9

A laminate was prepared in a manner similar to Example 5 except that chlorine vapors were used in place of the bromine vapors. The resulting laminate exhibited markedly improved adhesion.

When the processes set forth in Examples 6, 7 and 8 were repeated except that the butyral sheets were dipped into aqueous solution of the hydrogen halides instead of being exposed to the vapors, equally good results were obtained.

The processes of the present invention permit one to obtain good adhesion at temperatures and/or pressures lower than those presently employed in preparing glass laminates. The recommended pressure range for employing polyvinyl butyral to glass to form safety glass is approximately 150–175 lbs./sq. in. It has been found that when Butacite polyvinyl butyral has been fumed with hydrogen chloride vapors, pressures at least as low as 95 lbs./sq. in. give adhesive bonds at least as strong as those obtained at 150 lbs./sq. in. without the pretreatment, the laminating temperature being 225° F. in both instances. In general, pressures within the range of 90 to 190 lbs./sq. in. have been found to give good results when the polyvinyl acetals have been pretreated in accordance with this invention.

The laminates prepared according to the processes of the present invention can be used as windshields, sunglasses, etc.

What is claimed is:

1. In a process for the production of a polyvinyl acetal-glass laminate by bringing a polyvinyl acetal layer into contact with a glass sheet and then causing said polyvinyl acetal to adhere to the glass by heat and pressure, the improvement which consists of surface treating said acetal prior to contact with the glass with a reagent selected from the group consisting of halogens and hydrogen halides.

2. A process as defined in claim 1 wherein said treatment is effected by exposing said acetal to vapors of said reagent.

3. A process as defined in claim 1 wherein said reagent is iodine.

4. A process as defined in claim 1 wherein said ragent is bromine.

5. A process as defined in claim 1 wherein said reagent is chlorine.

6. A process as defined in claim 1 wherein said reagent is hydrogen bromide.

7. A process as defined in claim 1 wherein said reagent is hydrogen chloride.

8. A process as defined in claim 1 wherein said reagent is hydrogen iodide.

References Cited

UNITED STATES PATENTS 3,051,054   8/1962   Crandon _____ 156—106

ROBERT F. BURNETT, Primary Examiner

W. J. VAN BALEN, Assistant Examiner

U.S. Cl. X.R.

156—106; 161—199; 260—73